US008622861B2

(12) United States Patent
Nett et al.

(10) Patent No.: US 8,622,861 B2
(45) Date of Patent: Jan. 7, 2014

(54) HYBRID DRIVE UNIT AND METHOD FOR ITS OPERATION

(75) Inventors: Hans-Peter Nett, Adenau (DE); Ingo Steinberg, Köln (DE); Lutz Kather, Zülpich (DE); Wolfgang Brings, köln (DE); Christoph Göttert, Köln (DE); Christoph Grave, Ingolstadt (DE); Jan Haupt, Kürten (DE); David Ullmann, Schneeberg (DE)

(73) Assignee: Getrag Getriebe und Zahnradfabrik Hermann GmbH & Cie KG, Untergruppenbach (DE)

( * ) Notice: Subject to any disclaimer, the term of this patent is extended or adjusted under 35 U.S.C. 154(b) by 108 days.

(21) Appl. No.: 12/998,765

(22) PCT Filed: Dec. 1, 2009

(86) PCT No.: PCT/EP2009/066174
§ 371 (c)(1),
(2), (4) Date: Sep. 8, 2011

(87) PCT Pub. No.: WO2010/063735
PCT Pub. Date: Jun. 10, 2010

(65) Prior Publication Data
US 2011/0312460 A1    Dec. 22, 2011

(30) Foreign Application Priority Data

Dec. 1, 2008  (DE) .......................... 10 2008 037 618
Sep. 9, 2009  (DE) .......................... 10 2009 043 966

(51) Int. Cl.
*F16H 3/72* (2006.01)

(52) U.S. Cl.
USPC ............................................................ 475/5

(58) Field of Classification Search
USPC ...... 475/5, 1, 159, 160, 161; 74/606 R, 606 B
See application file for complete search history.

(56) References Cited

U.S. PATENT DOCUMENTS 5,513,719 A * 5/1996 Moroto et al. ............. 180/65.21
5,562,565 A * 10/1996 Moroto et al. ..................... 477/3

(Continued)

FOREIGN PATENT DOCUMENTS

| WO | WO 99/21263 A2 | 4/1999 |
| WO | WO 2007/062630 A1 | 6/2007 |
| WO | WO 2010/029035 A1 | 3/2010 |

OTHER PUBLICATIONS

English Translation of International Preliminary Report on Patentability, PCT/EP2009/066174, Jun. 7, 2011, 14 pgs.

(Continued)

*Primary Examiner* — David D Le
*Assistant Examiner* — David J Hlavka
(74) *Attorney, Agent, or Firm* — Paul D. Strain, Esq.; Strain & Strain PLLC

(57) ABSTRACT

The invention relates to a hybrid drive unit, in which for the most optimum possible synergetic use of the combustion engine drive and electromotive drive, a multi-speed clutch- and gear assembly is provided, in which both the combustion engine drive power and also the electromotive drive power is introduced into an input member of the clutch- and gear assembly. Hereby, numerous drive variants are made possible, which allow the drive machines to cooperate with each other according to requirements. The invention additionally relates to the method by which such a drive unit is operated.

10 Claims, 16 Drawing Sheets

(56) References Cited

U.S. PATENT DOCUMENTS

Figure 2:
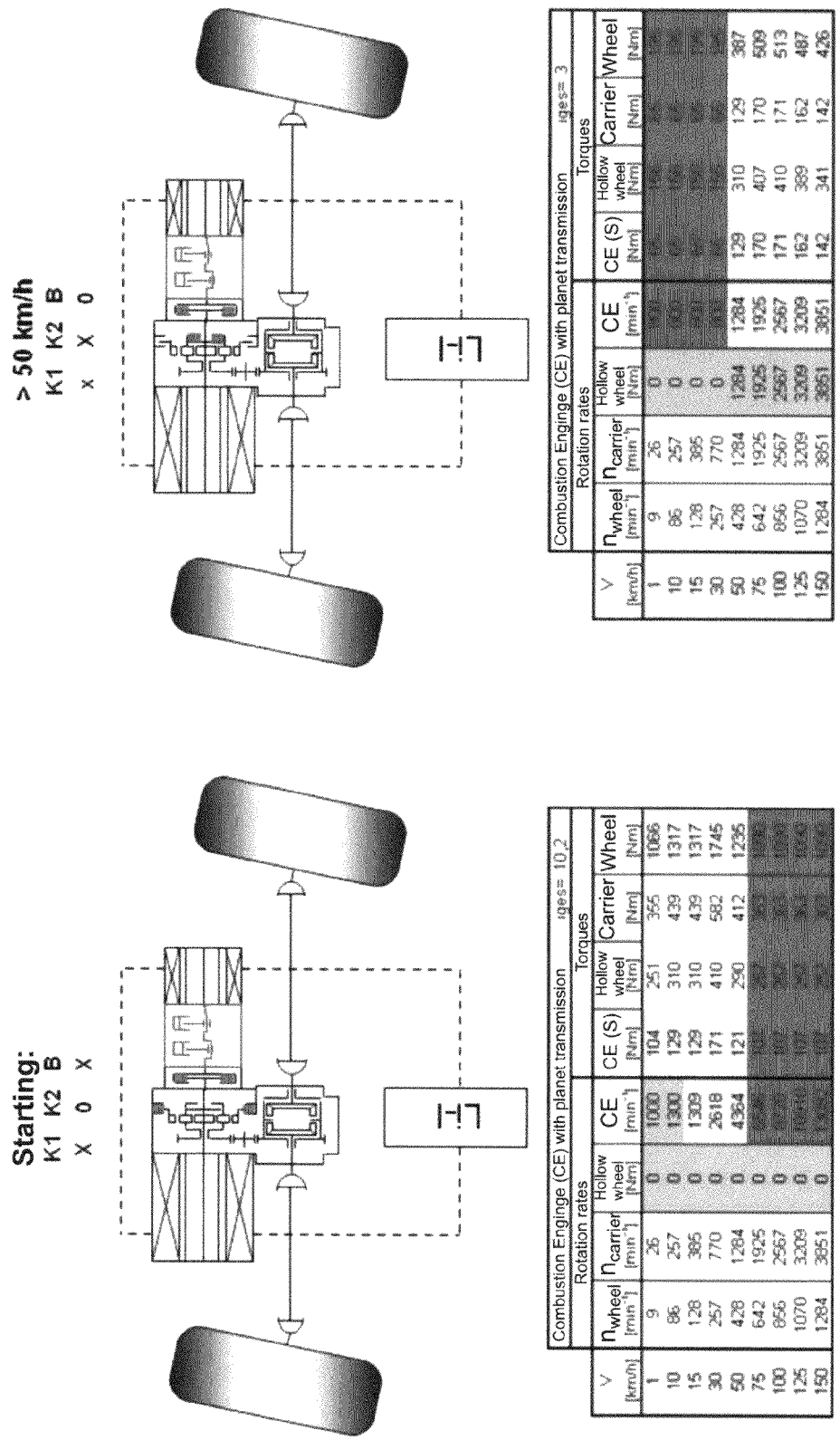

| | | |
|---|---|---|
| 7,086,977 B2* | 8/2006 | Supina et al. ............ 475/5 |
| 8,323,139 B2* | 12/2012 | Ike et al. ............ 475/159 |
| 2005/0209039 A1* | 9/2005 | Kempf ............ 475/159 |
| 2007/0072725 A1* | 3/2007 | Bucknor et al. ............ 475/5 |
| 2007/0219035 A1* | 9/2007 | Raghavan et al. ............ 475/5 |
| 2008/0081723 A1* | 4/2008 | Raghavan et al. ............ 475/5 |
| 2009/0186735 A1* | 7/2009 | Iwanaka et al. ............ 475/5 |
| 2009/0223727 A1 | 9/2009 | Tolksdorf |
| 2010/0041503 A1* | 2/2010 | Borntraeger ............ 475/5 |
| 2010/0069191 A1* | 3/2010 | Swales et al. ............ 475/5 |
| 2011/0120408 A1* | 5/2011 | Reese ............ 123/195 |
| 2011/0263370 A1 | 10/2011 | Borntraeger et al. |

OTHER PUBLICATIONS

International Search Report, International Application No. PCT/EP2009/066174, Dec. 15, 2010, 5 pgs.

* cited by examiner

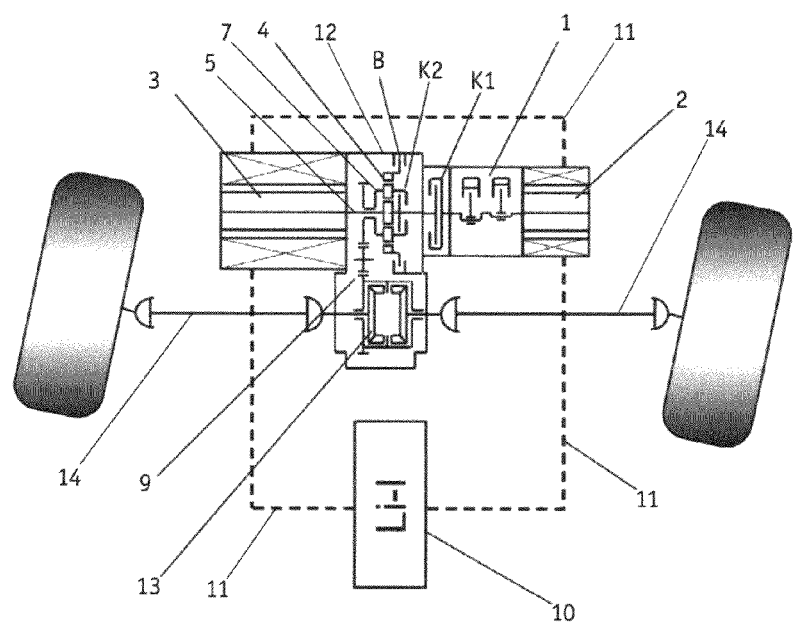
Fig. 1

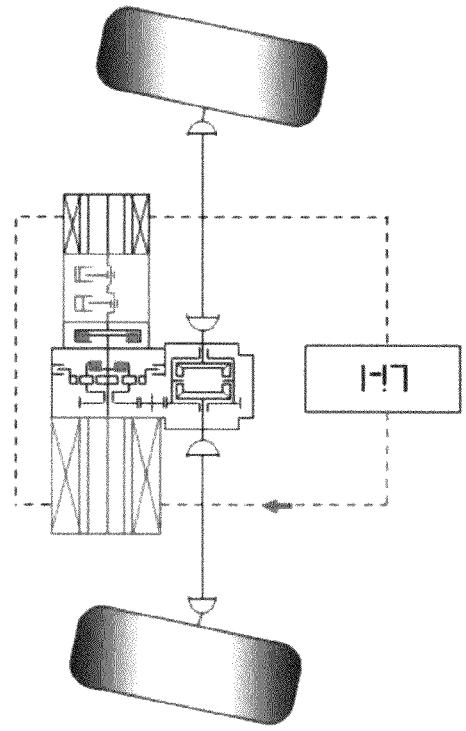
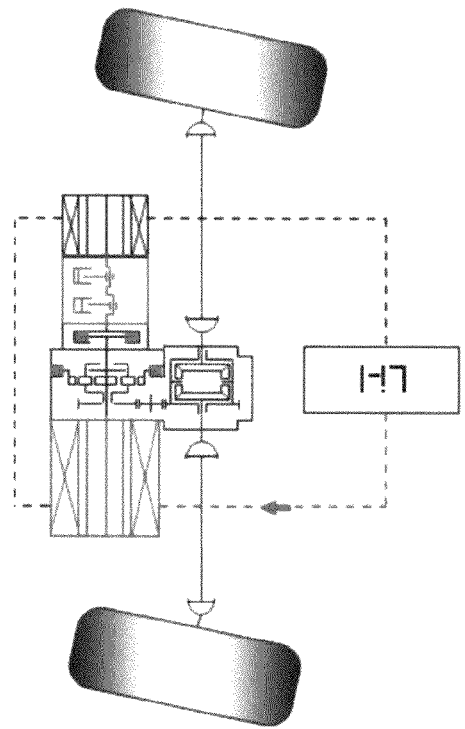
Fig. 4

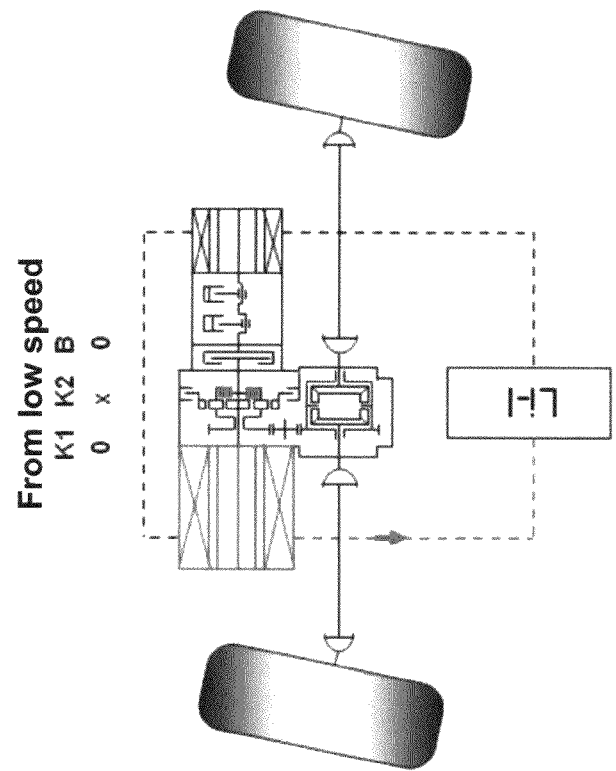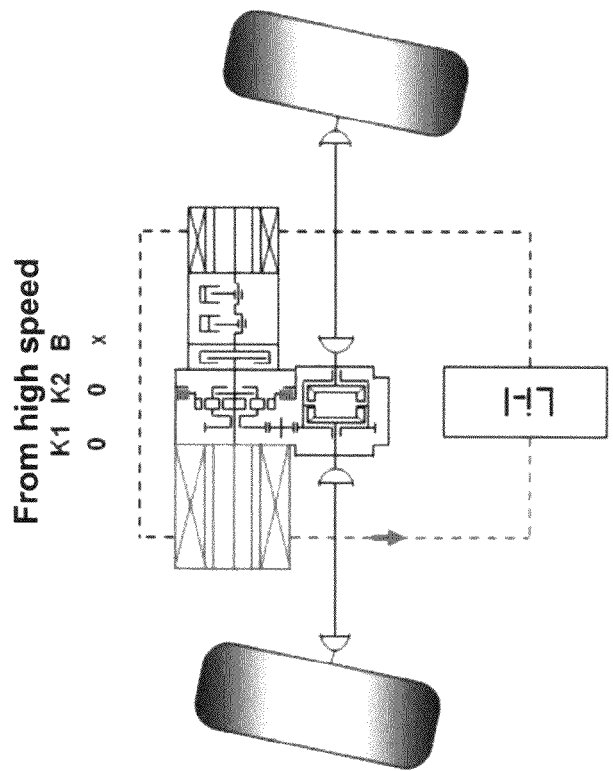
Fig. 8

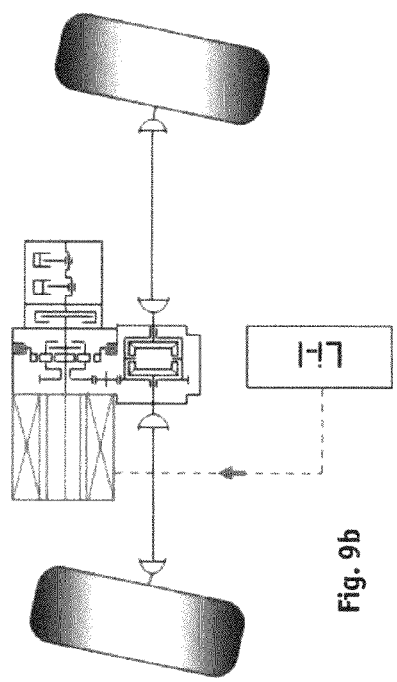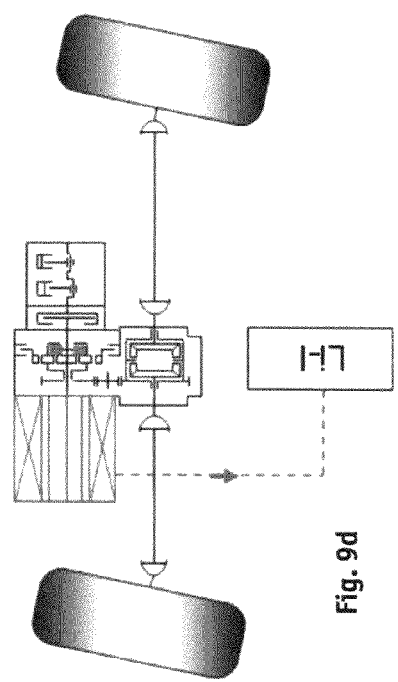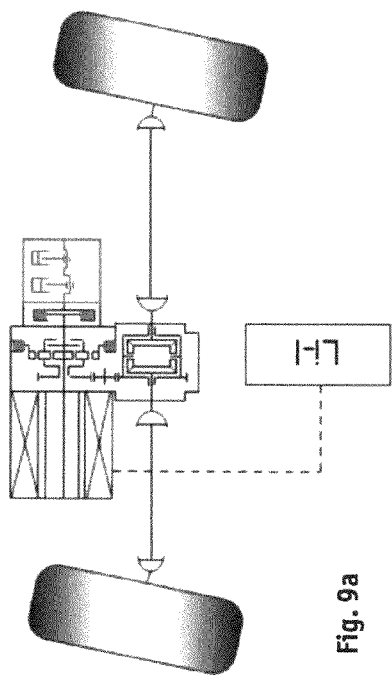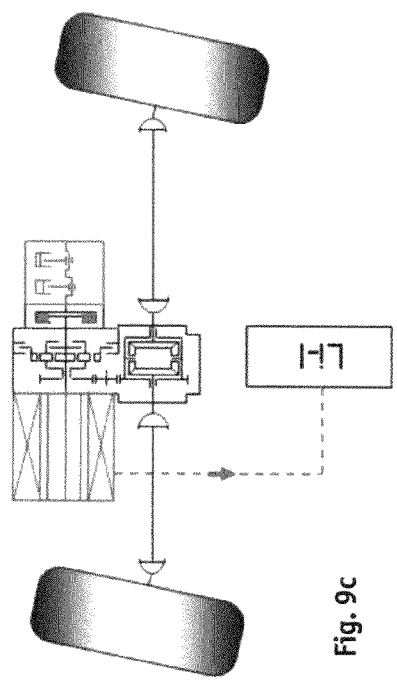

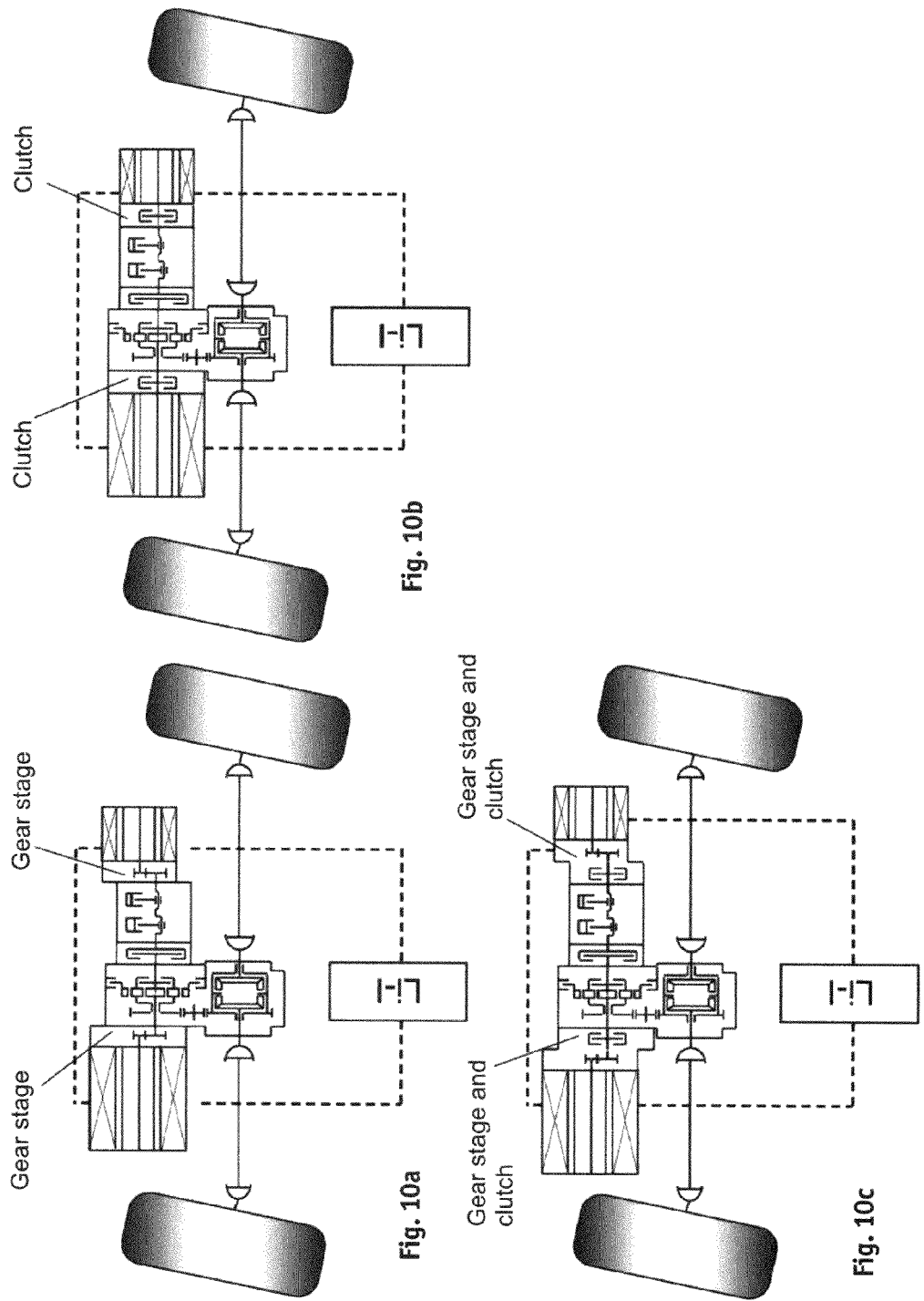

HYBRID DRIVE UNIT AND METHOD FOR ITS OPERATION

The invention relates to a hybrid drive unit for a hybrid vehicle, by means of which the vehicle can be driven, according to the operating state, by electric motor, by combustion engine or by a combination of electromotive and combustion engine drive. The drive unit comprises an electric driving machine, a combustion engine driving machine and a combined clutch- and gear assembly functioning as a shiftable multi-speed transmission, which provides at least a first gear and a second gear. The invention further relates to the method by which such a drive unit is operated.

Against the background of rising oil prices and of climate change, on which attention is being increasingly focussed, the automobile industry is in recent times being required more than ever to develop technologies which allow an energy-efficient mobility. Amongst these developments is hybrid technology, which can be divided roughly into two concepts—depending on whether the respective concept provides for the hybridisation of the purely combustion engine drive or the range increase of the purely electromotive drive by supplementing the drive by a combustion engine.

In the first concept, generally also designated as "plug-in hybrid",—proceeding from the purely combustion engine drive—in addition to or alongside the combustion engine an electromotive drive is also provided. The implementing of the full combustion engine power and also the keeping in reserve of high electric power with a correspondingly dimensioned energy store leads, however, to the vehicle mass having to be relatively great and the cost-benefit ratio having to be called into question. Plug-in hybrids therefore use similarly dimensioned combustion engines to conventional vehicles which are driven purely by combustion engine.

The second concept, which is also generally designated as "range extender", constitutes a special form of hybrid technology. Proceeding from the purely electric drive, to increase the range, a combustion engine is provided which is small in relation to the overall drive power requirement and which drives a generator by which the battery can be recharged. The system concept of the "range extender" is distinguished by high electric motor power and high battery capacity and a small combustion engine. Combustion engines with a fuel tank constitute, as it were, an additional energy store or a type of emergency power unit, by which the risk of being "stranded", which is frequently feared with a purely electric drive, is to be minimized. It is known here both to drive only a generator for the production of electrical driving energy via the combustion engine, and also to introduce the combustion engine power directly into the drive train.

Both of the above-mentioned concepts have the disadvantage that respectively the optimum synergy between electric drive and combustion engine drive is not found, whereby again the size and the weight of the units, the costs and the efficiency of the system can not be optimized to the maximum extent.

The transmission of the drive power takes place in hybrid drives as a rule via an interposed planetary gear with sun wheel, carrier and hollow wheel. Depending on which of these three input members is driven by combustion engine and which is driven electromotively, and on which of these input members the power output to the drive wheels takes place, different problems arise owing to the different kinematic conditions.

If, for example, the drive motor is picked up at the hollow wheel and the driving machine drives the carrier, then the drive torque which can be made available to the drive wheels can be reduced owing to the transmission condition towards the hollow wheel and reduces the acceleration behaviour and the gradeability. In order to obtain acceptable performance values here, a powerful driving machine with a high starting torque is therefore imperatively necessary in this concept. When the driving machine drives the hollow wheel, it is to be taken into consideration that it is coupled therewith at the low rotation speed level of the output, which in turn has a negative effect on the overall size of an E machine.

In particular, a multi-speed power shift transmission is also important for the suitability for daily use of a hybrid drive. If a transmission stage is absent, no speed-dependent adaption of engine characteristics can take place and the combustion engine and E machine are in many driving states to be operated far removed from the optimum operating points for the engine characteristics.

It is an object of the invention to provide a hybrid drive unit for a hybrid vehicle, which is able to minimize the disadvantages of known hybrid drives which are described above. In particular, the invention is to provide a hybrid drive unit which makes possible the efficient cooperation of the individual drives and of the drive train components (E machine, generator, combustion engine, transmission gearing), in order to achieve improvements compared with known systems with regard to range, $CO_2$ emission and vehicle weight.

A further object of the invention is to develop and use the clutch- and gear assembly as a two-speed transmission, such that in a simple manner a plurality of drive possibilities are produced. In addition to driving purely with an electric motor and purely with a combustion engine, a combined drive is also to be possible, in which the electric motor and the combustion engine respectively deliver a portion of the overall drive power, in order to be able to utilize the entire installed electromotive and combustion engine drive power. For each of the above-mentioned drive variants, both speeds of the clutch- and gear assembly are to be available, so that these can be configured in as optimized a manner as possible with regard to cost and need.

A further object of the invention consists in providing a hybrid drive unit with a shiftable, at least two-speed clutch- and gear assembly, in which a recuperation operation is possible in both speeds. In particular, a gear change is also to be possible in the recuperation operation, in order to be able to operate a generator optimally according to the current vehicle speed.

A further object of the invention is to provide a hybrid drive unit which has a high suitability for daily use. In particular a high gradeability and a good start-up behaviour are to be realized.

Moreover, a hybrid drive unit is to be created, the clutch- and gear assembly of which makes possible a gear change and/or the connecting or disconnecting of individual drive assemblies in a particularly simple manner, in particular also under load.

With regard to the clutch- and gear assembly and to the entire hybrid drive unit, a further object is to configure this such that it only requires a small installation space.

To solve the problems, the invention makes provision that the electromotive drive power and the combustion engine drive power in the first gear and in the second gear are introduced into the same input member of the gear assembly.

This approach also firstly constitutes a departure from the prevailing consideration of providing a power split in at least one gear. This power split, in which combustion engine power and electromotive power is transferred via at least two branches (paths) by parallel power introduction into different input members, makes possible a continuous operation of the electromotive drive machine. This is considered to be generally advantageous with regard to the wide rotation speed range which is constant as regards power. However, this advantage entails the disadvantage of having to support the drive torque on another input member of the same planetary gear. Therefore, in particular a hybrid drive system with a shiftable planetary gear is proposed, in which both the combustion engine and also the E machine are able to be coupled with each other via the same input member of a gear. Neither in the first nor in the second gear nor in any further gears which are possibly to be provided is the overall drive power, combined from combustion engine drive power and electromotive drive power, thereby transferred with a power split.

In order to be able to use the combustion engine in as optimum a manner as possible with regard to engine characteristics and to achieve the gradeability and starting capability which are aimed for, a multi-speed transmission, for example a 2-speed transmission, is necessary. For reasons of comfort, this transmission should be a power shift transmission and in addition it should have a simple construction with regard to costs and the installation space requirement. A planetary gear therefore presents itself as the gear configuration. A planetary gear has a sun wheel, a carrier and a hollow wheel. Through the fact that both the power of the combustion engine and that of the E machine as intended, depending on the operating state, are introduced simultaneously or selectively into an input member of the clutch- and gear assembly, preferably the sun, by targeted engagement onto the input members (sun, carrier, hollow wheel) from the exterior, different transmissions can be realized and at the same time a simple construction and a small installation space requirement can be presented despite a power shiftability.

As already mentioned, in the concept of the "range extender", which only has a low installed power from the combustion engine and also from the generator, it is important that for starting and also for a good gradeability, the greatest possible transmission of the planetary gear can be utilized. Therefore, it is an appropriate measure to preferably couple both driving machines, i.e. the combustion engine and the electric motor, with the sun. The output to the wheels preferably takes place via the carrier. Owing to the kinematic condition, the sum torque of sun and hollow wheel is produced here (static base equation $M_{carrier}=M_{sun}+M_{hollow\ wheel}$). The maximum torsional moment is therefore always applied at the drive wheels.

The hollow wheel can be held here in a structurally particularly simple manner so as to be torque-proof relative to the vehicle, for example via a brake which connects the hollow wheel in a torque-proof manner with the housing of the assembly. In this case, the greatest possible transmission is utilized for the output ($i_{revolution}$ ($M_{carrier}$)=$i_{status}$+1). In particular, the combustion engine is to be able to be connected directly with the drive wheels via a clutch. Therefore, both serial and also parallel hybrid operation is possible.

Through the configuration of a drive train, explained above, for a hybrid vehicle the following advantages in particular are produced:

The system performance is improved overall. By the utilization of the maximum planetary transmission and the output via the carrier, despite a low installed electrical drive power and a low combustion engine power, a high wheel torque can be produced. By the parallel connection of combustion engine and electric driving machine to a single input member of the clutch- and gear assembly, in particular to the sun of the planetary gear, in boost operation, i.e. with simultaneous usage of the combustion engine and the E machine, the drive torque can be increased once again.

Advantages are also produced with regard to consumption. By the use of the planetary gear as a two-speed transmission, the electric driving machine and the combustion engine can be operated to the greatest possible extent in the respectively optimum operating point. In the high speed range, the planetary gear rotates as a block, so that no losses occur on the cogging (revolution power) and on the bearings (bearing friction). By the free choice of the operating states, which can be selected optimally according to the travel status, a greatest possible $CO_2$ reduction potential is produced. The travel- or respectively operating states are, in particular:

a) Electromotive travel (primary travel/supplied via accumulator)
b) Electromotive travel supplied via the combustion engine
c) Hybrid travel (boosting)
d) Combustion engine travel In all travel states, both gears provided by the clutch- and transmission assembly can be utilized. This also applies, moreover, to the recuperation operation.

Packaging advantages are additionally produced by the coaxial arrangement of the drive assemblies, which makes a compact construction possible.

Through the fact that only a relatively small combustion engine is necessary, furthermore the downsizing of the combustion engine becomes possible. The combustion engine undertakes substantially stationary travel, whereas the electromotive drive machine covers substantially the dynamic travel component. A small combustion engine (CE) therefore means here both low consumption, low weight, lower costs and minimized installation space requirement.

The selected arrangement of engine and transmission corresponds in addition to the arrangement which is conventional today, so that on conversion to hybrid technology, the vehicle architecture can be retained largely untouched, which makes the integration of the described drive train into existing systems particularly simple.

In addition to the described drive train concept for a hybrid vehicle, the described method for operating a hybrid vehicle is also regarded as belonging to the invention.

Further features and advantages of the invention will be apparent from the subclaims and from the following description of preferred example embodiments with the aid of the figures.

Figure 3:
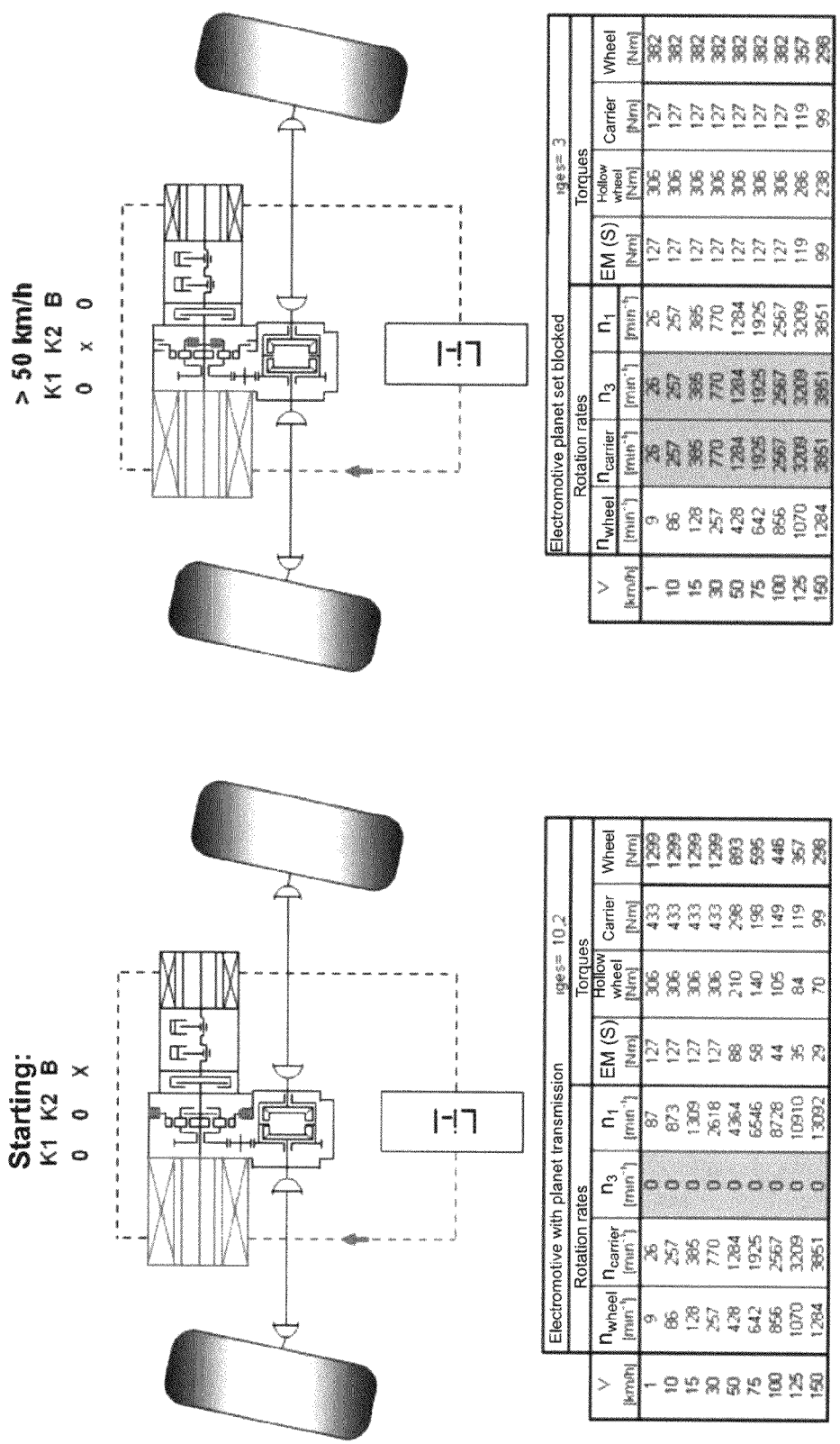
Figure 5:
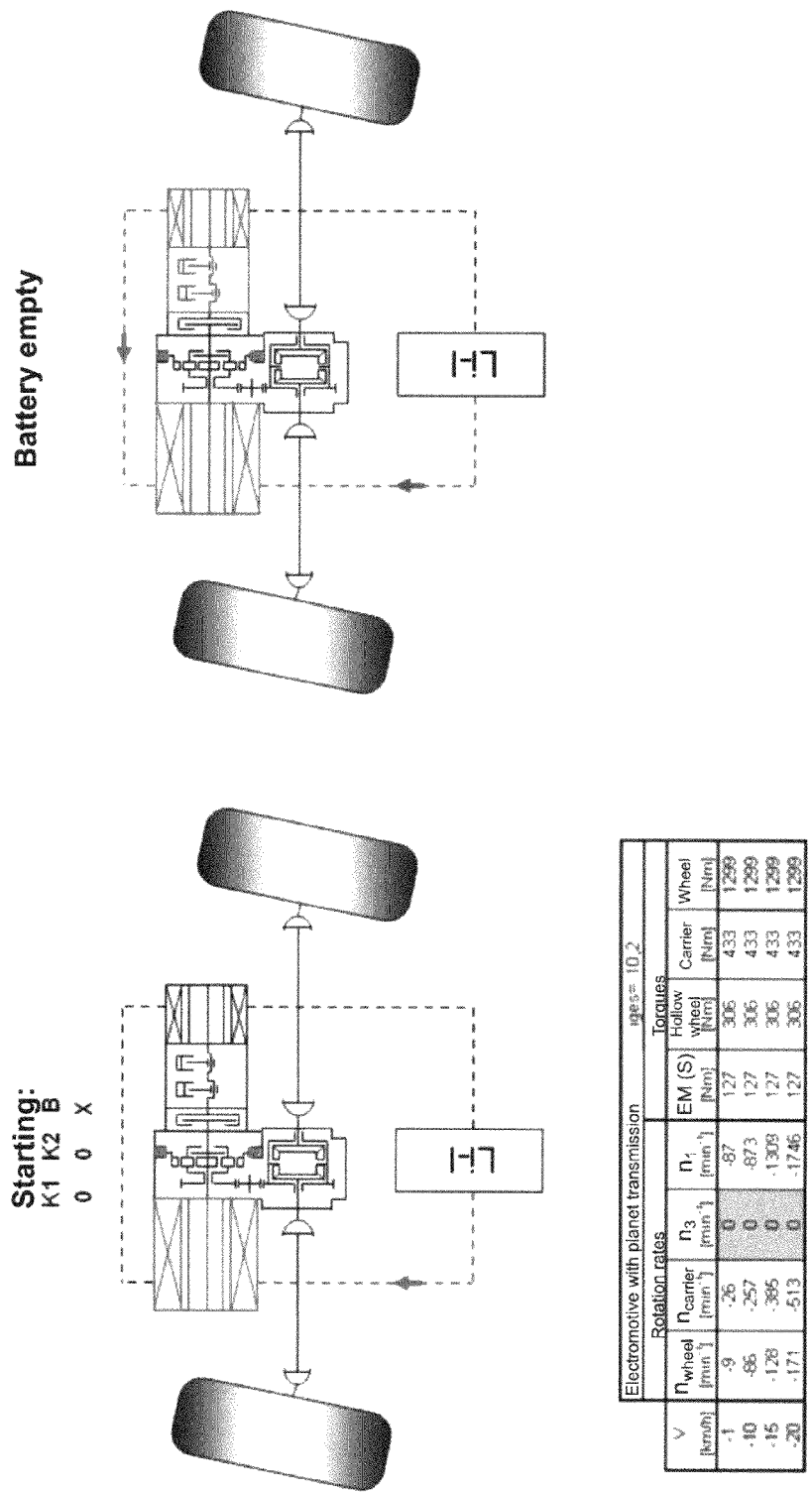
Figure 7:
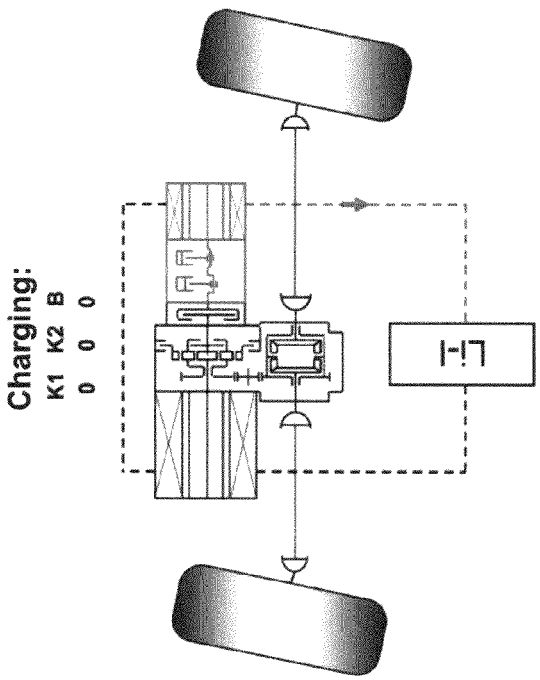
Figure 6:
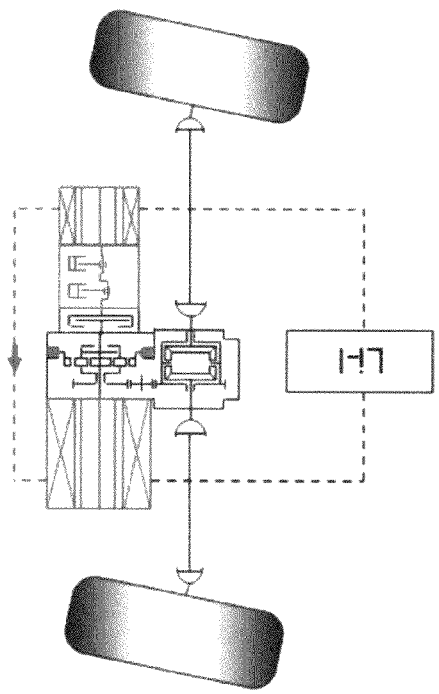
Figure 11:
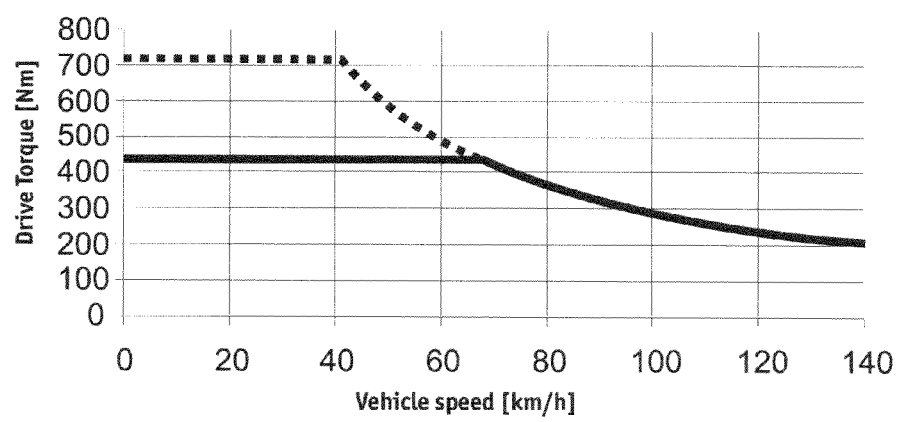
Figure 12:
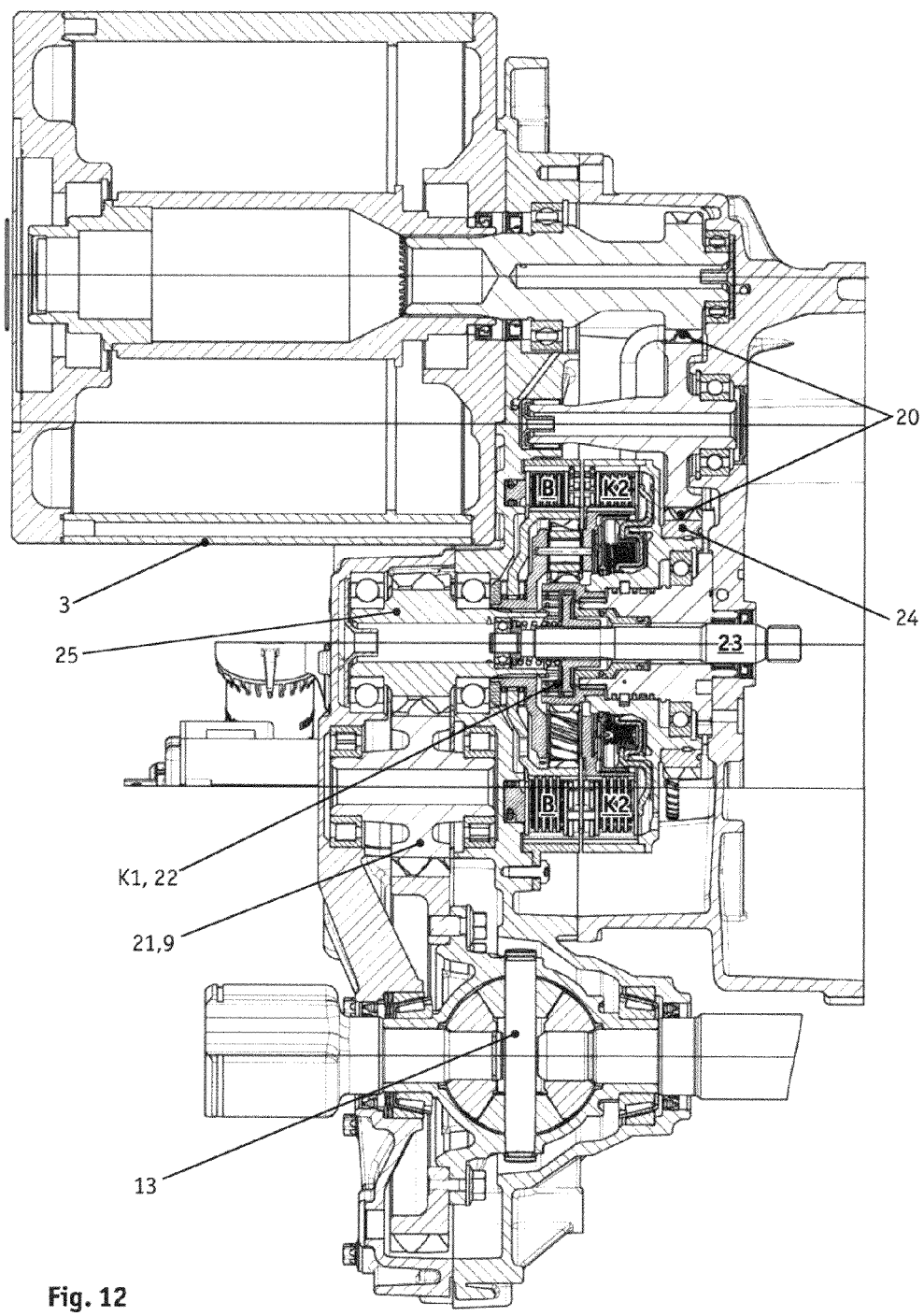
Figure 13:
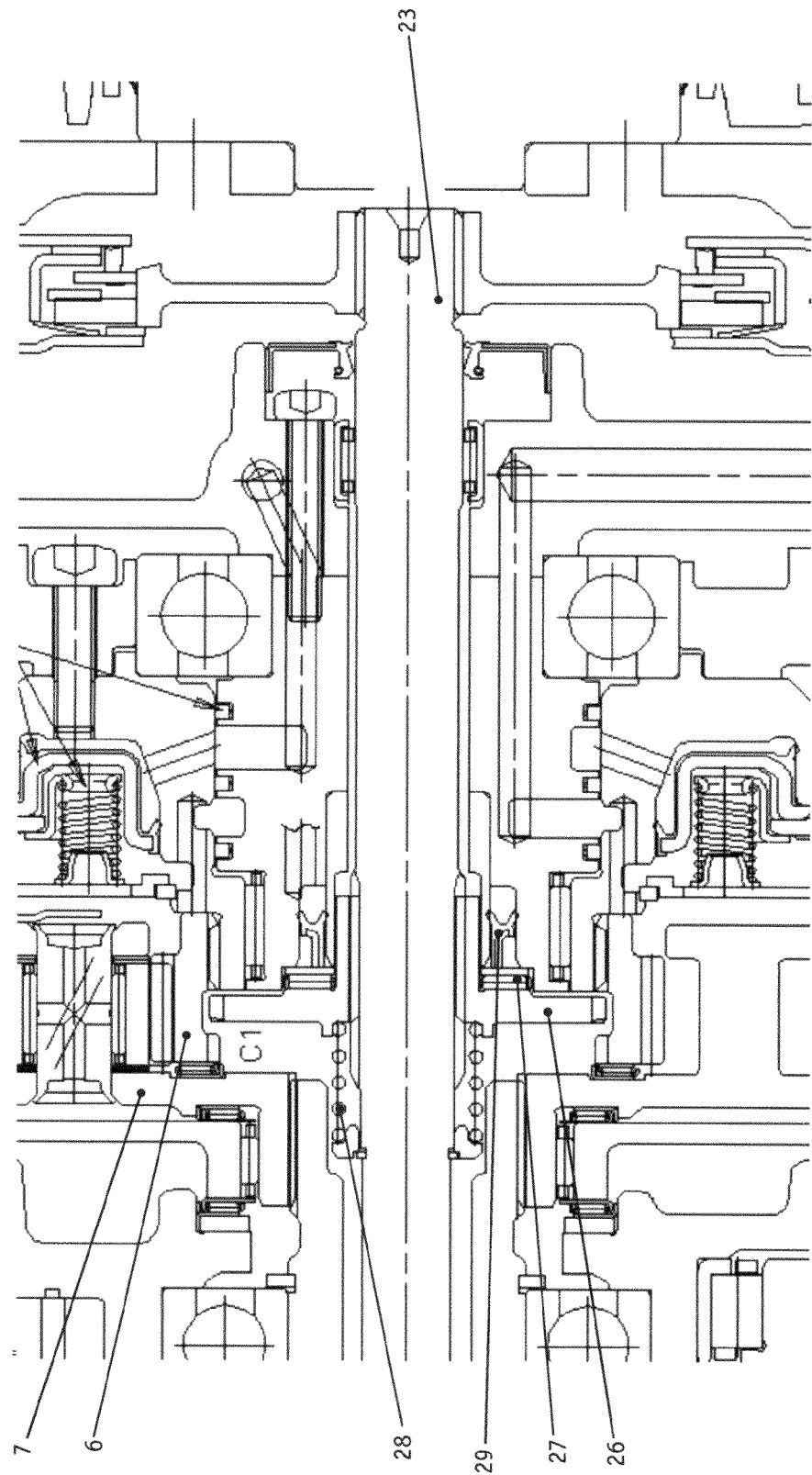
Figure 14:
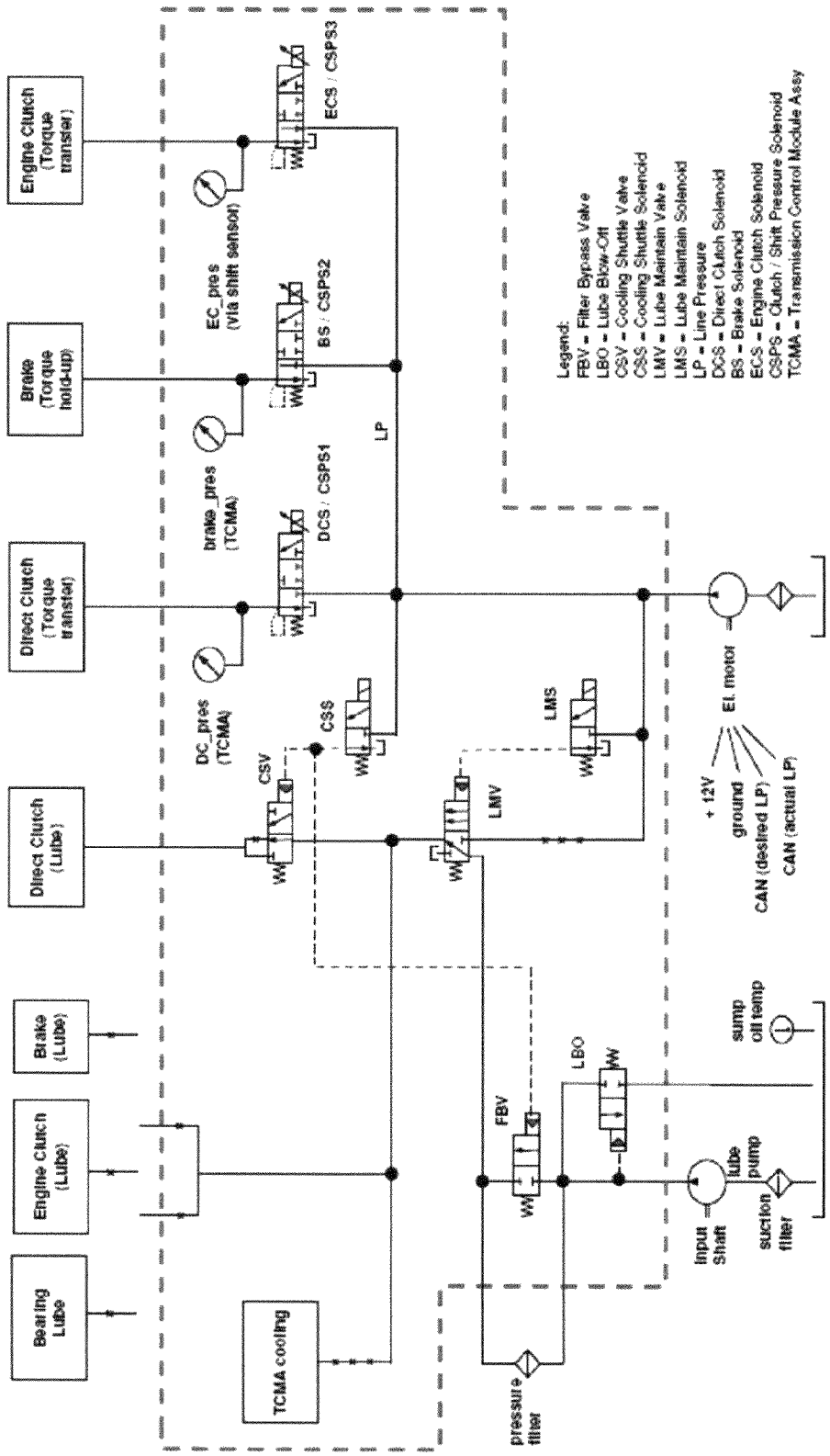
Figure 15:
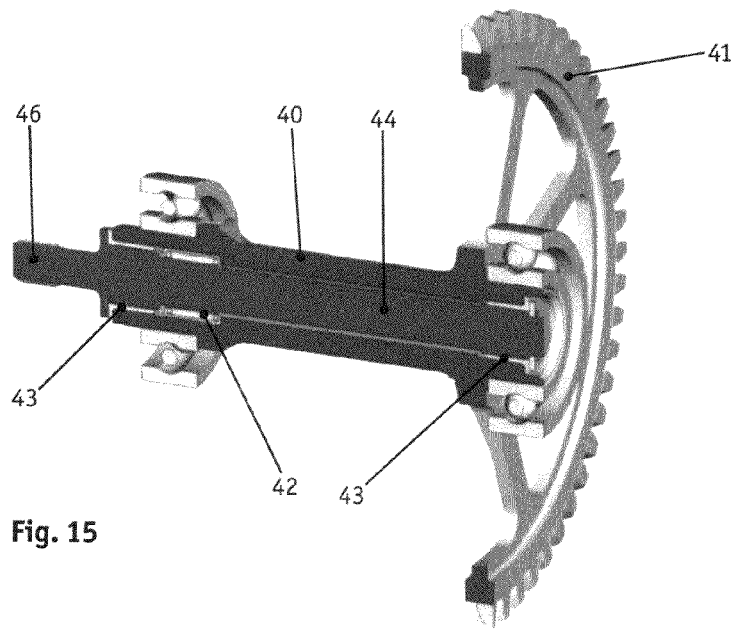
Figure 16:
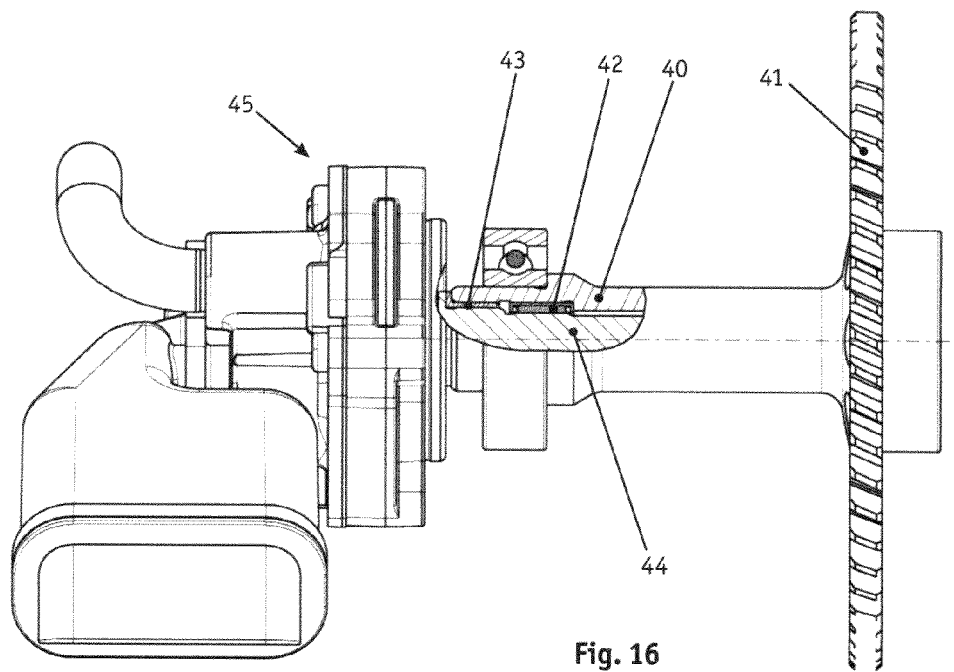
Figure 17:
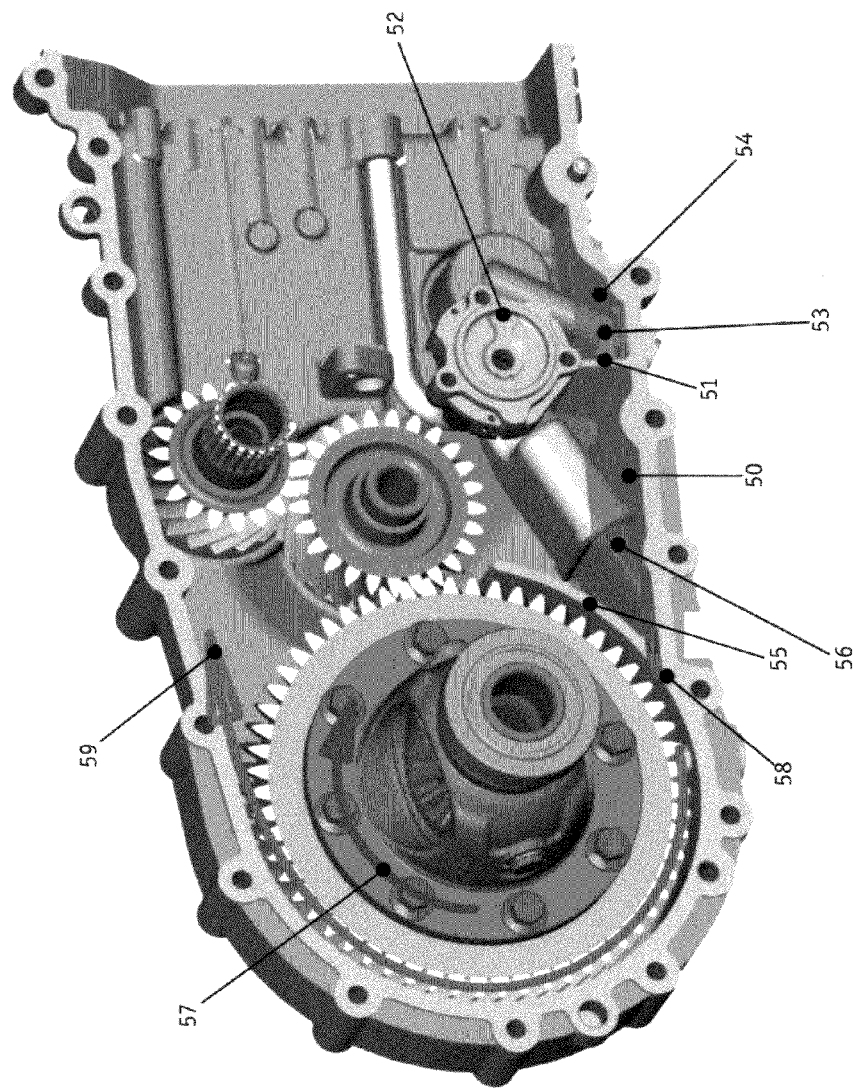
Figure 19:
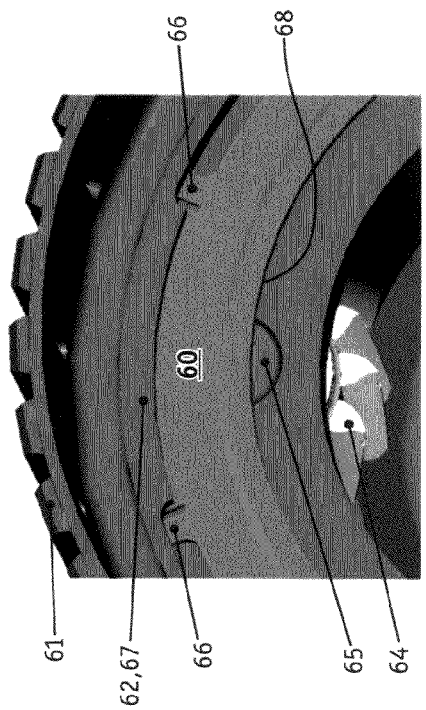
Figure 20:
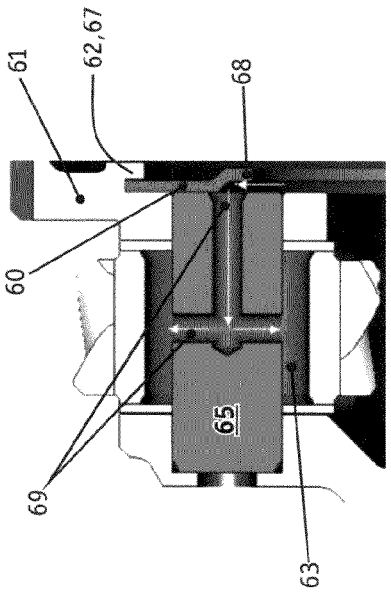
Figure 18:
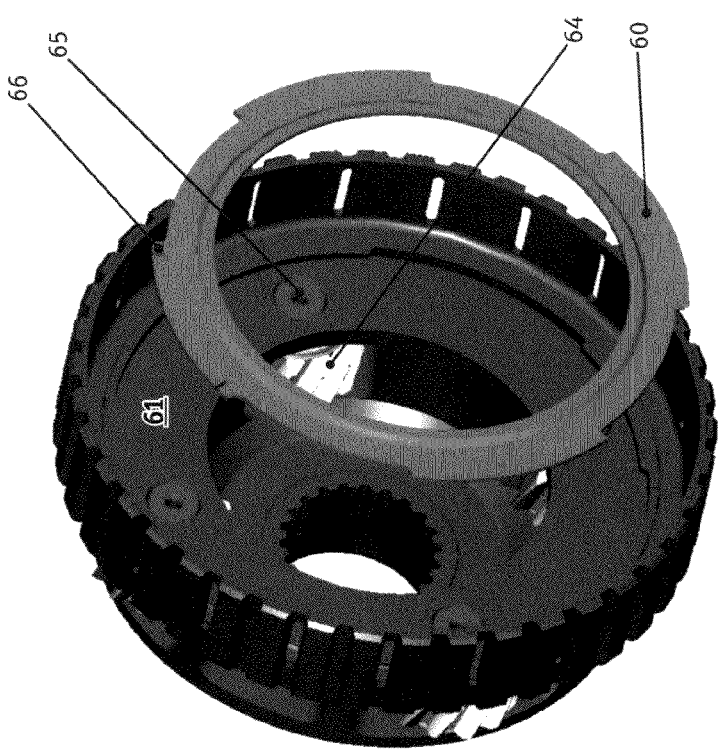

In the figures, there are shown:

FIG. 1 a diagrammatic view of a hybrid drive unit,

FIG. 2 two travel states with a purely combustion engine drive,

FIG. 3 two travel states with a purely electromotive drive,

FIG. 4 two travel states with combined electromotive and combustion engine drive, FIG. 5 the reverse travel with full or respectively empty battery, FIG. 6 the use of the drive unit as a serial hybrid, FIG. 7 the use of the combustion engine for charging the battery, FIG. 8 the travel state of recuperating at different vehicle speeds, FIGS. 9a to 9d the operation of the drive unit with a combined generator/motor in different travel states, FIGS. 10a to 10c alternative embodiments of the drive unit with additional clutches and/or transmission stages, FIG. 11 a diagrammatic illustration of an optimum configuration of the transmission of a two-speed planetary gear for the hybrid drive unit, FIG. 12 a sectional view through a hybrid drive unit without flange-mounted combustion engine and generator, FIG. 13 a detail view of a clutch unit for the coupling of the combustion engine to the input member of the clutch- and gear assembly, FIG. 14 a schematic overview diagram of a preferred pressure-, lubrication- and cooling oil supply for the hybrid drive unit, FIG. 15 a first illustration of a preferred pump drive for the hybrid drive unit, with shafts coupled via a free-wheel arrangement, FIG. 16 a second illustration of the pump drive of FIG. 15 with flange-mounted lubricating oil pump, FIG. 17 the structure of a housing preferably used for the hybrid drive unit, with special oil volume distribution through partition walls, FIG. 18 a perspective overall view of a preferred embodiment of a planet carrier for the hybrid drive unit, with an oiling plate, promoting the component oiling, to be inserted therein, FIG. 19 a detail view of the planet carrier of FIG. 18 with inserted oiling plate, and FIG. 20 the view of a section through a planet pin of the planet carrier of FIG. 19.

In FIG. 1 the hybrid drive unit is illustrated diagrammatically. The drive unit comprises a combustion engine 1, a generator 2 and an E machine 3. A planetary gear 4 is arranged between combustion engine 1 and E machine 3. The combustion engine 1 and E machine 3 are connected via a shaft, preferably by a shared shaft 5, with the same input member, preferably with the sun 6 of the planetary gear. The removal of the output power takes place via the carrier 7 of the planetary gear 4.

Between combustion engine 1 and sun 6, a first clutch K1 is arranged, which serves to couple or uncouple the combustion engine 1 according to requirements. By closing the second clutch K2, the planet set or respectively the carrier 7 with the sun 6 is blocked and the drive torque at the sun 6 arrives with a planet transmission of 1:1 as far as possible free of loss to the output. The clutch K2 therefore blocks two members of the planetary gear 4, so that they revolve with a rotation rate as a block, when the clutch K2 is closed. Exclusively clutch power "flows". The transmission between these two input members and therefore between drive member and output member accordingly is 1:1. Furthermore, the hollow wheel 8 can be connected in a torque-free manner via a brake B with the housing 12. With the brake B, the hollow wheel 8 can therefore be supported to the housing 12, so that at the output, with clutch K2 opened, the greatest possible planetary transmission is produced.

In this particularly simple manner, different transmissions can be realized, without in so doing having to appreciably extend the hybrid drive trains which are already known. By utilizing the brake B and the clutch K2, a two-speed transmission can be realized in a structurally simple manner.

A transmission stage 9, also designated alternatively as "final drive" can be arranged downstream of the carrier output of the planetary gear 4, which stage serves to multiply the transmission of the planetary gear 4 once again and to bridge the distance between the drive unit and the differential 13 or respectively the side shafts 14 of the drive wheels. The specialist in the art will know how to optimize for the respective case of application the configuration of the planetary gear or respectively of the drive train and the transmissions which are realized thereby, including possible transmissions arranged upstream or downstream.

In FIG. 1 it can be seen in addition that the electric motor 3 draws its electrical energy via the battery 10. The battery, designated in FIG. 1 as a lithium ion battery, is connected via lines 11 with the two electric machines (electric drive machine 3 and generator 2). In addition, the generator 2 is connected via lines 11 with the battery 10.

Individual travel states of the hybrid drive unit shown in FIG. 1 are explained by means of the further following figures. The designation of individual components can be transferred from FIG. 1 to FIGS. 2 to 10c. The tables, represented in part under the following diagrammatic illustrations clarify by means of model calculations as a function of the vehicle speed particular operating parameters such as the rotation speeds and torques of the combustion engine and transmission members and also the torques acting on the drive wheels. The engine characteristic range, in which the combustion engine operation is eliminated rather, owing to the engine rotation speeds occurring due to the respectively effective assumptions for the model calculation, is highlighted respectively in red. An "X" allocated to the abbreviations K1, K2 or B means that the respective clutch or respectively brake is closed, an "O" means that the respective clutch or respectively brake is open. In order to clarify that a clutch or respectively the brake is closed, its edge region, operating in a frictionally engaged manner, is additionally highlighted in red. The drive components contributing for the respectively represented travel state are also emphasized in red for clarification of the drive power flow.

FIG. 2 illustrates travel purely with the combustion engine, and namely once for starting up and once for a travel state at higher speeds, here for example at a speed greater than 50 km/h. In both cases, the combustion engine is connected with the sun via the clutch K1. In order to obtain a high transmission on starting up, the hollow wheel is supported via the brake B towards the housing. So that the engine rotation rate remains limited at higher speed, starting from approximately 50 km/h the brake B is released and the clutch K2 is closed. The planet set therefore rotates as a block, free of loss, with the transmission 1:1.

By the rigid coupling of the E machine to the sun, in the travel states shown in FIG. 2 the rotor co-rotates as it were in a loss-free manner. No current flows from the battery to the electric driving machine. Alternatively, however, the rotor may also be uncoupled via an additional clutch which is not illustrated in FIGS. 1 and 2.

FIG. 3 shows purely electromotive travel. By opening the clutch K1, the combustion engine is uncoupled. The E machine transfers the drive torque to the sun of the planetary gear. In a similar manner to combustion engine travel, the planetary gear is used as a two-speed transmission by activating the brake B and the clutch K2, in order to be able to operate the E machine with the optimum operating engine characteristics.

In FIG. 4 the so-called "boost operation" is illustrated, in which the electric motor and the combustion engine drive the vehicle alongside each other. By closing the clutch K1, the combustion engine and the electric motor can be connected with the sun, so that both drive powers can be utilized in parallel (boost operation) for propulsion. The difference from FIG. 2 becomes clear in particular in that in FIG. 4, shown by the red highlighting of the line carrying current and by the arrow which is drawn, current flows from the battery to the electric motor. As a high transmission also occurs here at the planetary gear by closing of the brake B, particularly high drive torques are produced, which once again significantly improve the acceleration behaviour and also the gradeability compared with the purely combustion engine drive or the purely electromotive drive. At speeds of more than the 50 km/h, which is indicated here purely by way of example, and by closing the clutch K2, the planet set then rotates again with the transmission 1 as a block and reduces the engine rotation rate at higher speeds.

FIG. 5 clarifies that with the described hybrid drive unit, travel can also take place in reverse, and namely independently of the state of charge of the battery and without the provision of an additional gear stage reversing the rotation direction. The arrangement of the planetary gear does not contain the possibility of reversal of the rotation direction. For reverse travel therefore the electric motor is operated in the other rotation direction. By closing the brake B, a high transmission is produced, as in the forward travel, which provides for a high starting torque. The necessary energy is provided by the battery, as the left-hand portion of FIG. 5 shows by the coloured highlighting of the corresponding lines 11. If the state of charge of the battery is too low, the generator can be operated via the combustion engine with the clutch K1 released, so that a reverse travel is ensured even in the case of a (partially) discharged accumulator.

The possibility of using the hybrid drive unit in loco operation (serial hybrid) is illustrated by FIG. 6. The generator is driven via the combustion engine. The generated current supplies the electric driving machine directly. Thereby, a continuous electrical drive is possible. As in the other travel states, the planetary gear can also be used here as a two-speed transmission.

FIG. 7 shows further that for the case where a low state of charge of the battery does not make electric travel possible, the generator can be operated directly from the combustion engine for charging. For this, the clutch K1 is open.

On recuperation (braking), which is described by means of FIG. 8, the electric driving machine drives the vehicle. So that the planetary gear can transfer the torsional moment to the sun shaft, either the brake B or the clutch K2 must be closed, because otherwise the planetary gear would rotate freely. Preferably, at higher speeds the brake B is activated, so as not to have to drive the rotation rate so high at the E machine or respectively at the generator. At low speeds, it may be more favourable to close the clutch K2, in order to be able to operate the generator or in order to be able to operate the electric driving machine in a generator-based manner, i.e. in the manner of a generator, as optimally as possible with regard to the engine characteristics.

Whereas in the figures described above one has always proceeded from the drive unit having a generator which is coupled with the combustion engine and is separate from the electric driving machine, the following figures show that with the hybrid drive system the drive is also possible without such a generator and only with a combined generator/motor. In order to save the expenditure for the generator, the same structural assembly of planetary gear and E machine can be used in the sense of a "range extender".

For the pure combustion engine operation, as FIG. 9a shows for the case of starting up according to the left-hand image in FIG. 2, clutch K1 and brake B are closed. The rotor of the electric driving machine co-rotates as it were in a loss-free manner. In the pure electromotive drive shown in FIG. 9b, for the same state of travel it applies than clutch K1 and K2 are open, whereas brake B is closed. Current flows from the battery to the electromotive drive. In the battery charging operation, which is shown in FIG. 9c, the E machine is used as a generator, by the latter being driven by the combustion engine. For this, the clutch K1 is closed. The clutch K2 and the brake B remain open here, because otherwise the flow of force would be produced to the wheels. In the recuperating in coasting mode, clutch K1 is closed, so that the wheels rolling on the road drive the electric machine, so that it can generate energy which is stored intermediately in the battery.

By the omission of the generator, a very favourably-priced solution can be presented, without involving great restrictions in performance and capabilities for use.

FIGS. 10a, 10b and 10c show further variants of the hybrid drive unit with additional gear stages and/or additional separating clutch(es). As electric machines as a rule cover a distinctly broader rotation rate band than combustion engines (whereby with the same power, savings can be made with regard to weight and costs), preferably either a transmission is to be placed between the combustion engine and sun wheel, and/or—so as not to set the rotation rates in the planetary gear too high—between the electric machine and sun. Alternatively, a clutch can be additionally provided between the electric machine and sun, in order to be able to uncouple the mass inertia and the drag torque of the electric machine from the drive train during the pure combustion engine operation. This clutch can be dispensed with in particular when for the purpose of reducing costs and weight and also for optimizing the consumption the combustion engine is configured so that it can not cover the dynamic components of the travel states, but rather is only intended to operate the base load of the travel resistance curve. In this case the clutch—as the electric machine is required for every change to the travel state—would only cause additional weight and costs and should therefore preferably be omitted.

Depending on the configuration of the two electric machines, E motor and generator, a gear stage is therefore to be provided between the combustion engine and the electric machines. It is thereby possible that the machines can be operated in the respectively optimum range with regard to efficiency. Furthermore, depending on the embodiment of the generator, a clutch can be arranged between the combustion engine and the generator. Thereby, with combustion engine travel, the generator can be separated from the drive train, whereby the efficiency of the drive train is increased. The same applies to the electric motor. Provision may also be made to arrange the generator—in relation to the power flow—between the clutch/gear assembly and the combustion engine or parallel to the combustion engine, so that for example in the recuperation operation the combustion engine does not imperatively have to be carried along. Also, under certain circumstances, for example when the transmissions provided by the clutch- and gear assembly would not ensure an optimum operation of the combustion engine with regard to engine characteristics, it can also be appropriate to arrange a further gear stage between the combustion engine and the clutch- and gear assembly, in order to make possible as optimum as possible an operation of the combustion engine with regard to engine characteristics. The specialist in the art will recognize the need for an additional clutch or gear stage situated between the clutch- and gear assembly for the respective case of application and will provide this accordingly.

The above-mentioned variants of the drive train with additional gear stages and additional separating clutches can also be combined, as FIG. 10c shows. Through the combination of gear stage and clutch, the system becomes more flexible with regard to adapting to the respective engine characteristics and with regard to the idling losses of the two E machines.

Of course, the invention is not restricted to an application on the front axle drive with front engine, illustrated purely by way of example in the figures. The invention is, moreover, not restricted to hybrid drive units in which combustion engine drive power and electromotive drive power are introduced into the sun wheel of a planetary gear. The drive powers can also be introduced according to intentions into another input member of the clutch- and gear assembly, with a planetary gear therefore in particular into the carrier or the hollow wheel. The output is also not imperatively to be realized via the carrier. Depending on the concept and transmission stages arranged upstream or respectively downstream, a different embodiment can also be expedient, in which the power output takes place via the sun or the hollow wheel. To block the planetary gear, in addition it is not imperative to block the carrier with the sun. Of course, the clutch K2 can also be arranged so that it blocks two other input members with each other, for example the carrier with the hollow wheel.

Of course, the consideration that in a first and in a second gear both the combustion engine drive power and also the electromotive drive power is introduced into respectively the same first input member of the clutch- and gear assembly and therefore no power-split drive power transmission is provided, does not preclude a further clutch being able to be provided, which makes possible a power-split operation. Thus for example between the combustion engine and a further second input member, in particular the hollow wheel, a third clutch K3 can be provided (not shown in the figures), which couples combustion engine and second input member with each other, if applicable with a transmission stage acting therebetween, designed for the optimum operation of the combustion engine with regard to engine characteristics. If the clutch K1 and the clutch K2 are then opened, in addition a power-split operation can be realized to the non power-split operation of the drive unit in the first and second gear, in which the electromotive power is introduced into a first input member and the combustion engine power is introduced into a second input member, so that the advantages of the power-split drive which were previously described would be able to be realized via a planetary gear.

Some further aspects of the hybrid drive unit will be explained below with reference to FIGS. 11 to 13.

By means of FIG. 11, firstly a preferred configuration of the transmission ratios of a 2-speed transmission is explained. Electric drives and serial hybrids which are used today have, as a rule, only one gear transmission. This is possible, because electric machines have a constant power over a wide range (in the field weakening range) and therefore various transmission ratios show no effect in this range.

In a particular range close to standstill, however, they are torque-controlled (horizontal course of the speed-dependent curve progression up to the bend). This leads to the drive machine having to be constructed distinctly larger than is necessary for normal operation, in order to be able to represent the required acceleration values in the low speed range and the required gradeability.

If the electric machine is now connected via a 2-speed transmission, then ideally the two gear stages can be configured so that the constant power range in the first gear (dashed line in FIG. 11 after the bend in the curve progression) joins seamlessly on to the constant power range in the second gear (solid line in FIG. 11 after the bend in the curve progression.

Preferably, the spread is selected here so that the maximum speed which is able to be reached in the first gear is higher than the speed at which the electric motor is limited in its torque in the second gear. According to the case of application, the spread can be selected here so that the maximum speed in the first gear lies as close as possible to this transition speed, in order to reach as high a starting torque as possible. The limit case is reached when the maximum speed in the first gear coincides with the limit speed in the second gear. In the permanently energized synchronous machines which are usually used, in which the limit speed is approximately ⅓ of the maximum speed, a spread close to 3 is produced.

So that during the shifting, which is preferably carried out free of torque interruption, the maximum permissible rotation rate is not exceeded, the spread can be reduced by up to 10%, whereby an ideal spread of 2.7 to 2.8 is produced.

Thereby, a drive unit is described, in particular a drive unit for a drive train as described above, the drive train has a multi-speed planetary gear to which an electric drive machine is connected, whereby the gear stages are configured such that the constant power range of the electric drive machine in the first gear largely joins on seamlessly to the constant power range in the second gear.

FIGS. 12 and 13, which are to be referred to for an understanding of the following embodiments, show further structural details of the hybrid drive unit.

A particular challenge occurs with regard to the space requirement, because a two-speed transmission (which requires at least two clutches or respectively brakes K2 and B), a clutch K1 to the combustion engine, a transmission 20 between the electric motor and the combustion engine and a rotation direction correction element 21 (if the arrangement in the front of the car is to correspond to the standard) are to be housed in a very limited installation space. The rotation direction correction element 21 corresponds here to the final drive transmission stage 9 mentioned with respect to FIG. 1. Preferably, the clutch K2 and the brake B are arranged here around the planetary gear, because the clutch or respectively brake—which are preferably to be represented acting in a frictionally engaged manner to represent the full powershift ability under load—require a minimum diameter to provide the necessary torque capacity. When measures are provided for the synchronization of the components which are to be coupled, the clutch K2 and the brake B can of course also be designed as clutches acting in a positive-fitting manner.

As a further saving, the clutch by which the combustion engine can be uncoupled from the sun, can then preferably be arranged inside the sun. This clutch is preferably constructed here as a claw clutch 22. To actuate this clutch, a hydraulic system can be provided, wherein the pressure oil supply can be directed by the same element as the oil supply of the planetary gear clutches.

A further preferable embodiment can make provision to arrange the output of the electric motor with the transmission which is to be provided at least partially aligned to the clutch package, preferably offset slightly in the direction of the combustion engine, so that the last gear stage joins directly onto the clutch package or respectively engages thereon. The actuation of a planetary gear clutch can be arranged here so that essential elements, such as for example the oil chamber, which receives the hydraulic piston in a hydraulically actuated clutch, are formed by the same element, which also forms the sun and the gear stage to the electric motor.

The electric machine is also to be arranged in alignment with the rotation direction correcting element 21, which preferably joins on to the clutch package on the side facing away from the combustion engine. The element 21 here can be for example an intermediate shaft (correcting the rotation direction) or a belt- or chain drive (as a rule not correcting the rotation direction) of the axle drive. The latter is to be preferred when the drive unit is installed rotated through 180° to the vertical axis and the rotation direction of the combustion engine is maintained.

FIG. 13 clarifies further distinctive features of the drive unit according to the invention.

In order to make possible a short arrangement for vehicles with a front transverse assembly, the arrangement described below is selected: The combustion engine, which drives the engine shaft 23, the drive input 24 of the electric motor (i.e. the drive part by which the electromotive power is finally introduced into the planetary gear), the planetary gear itself and also the axle drive pinion/output member 25, from which the drive power is finally removed and starting from which the drive power is passed on via a downstream transmission stage to the drive axle differential 13, are arranged coaxially. The electric motor 3, arranged axially parallel to the combustion engine, is connected via one or more gearwheel stages 20 for connection of the combustion engine to the planet two-speed transmission. The dimension between axes is deliberately selected here so that the electric driving machine can be arranged at least partly adjacent to axle drive or respectively planetary gear.

FIG. 13, which is described below, illustrates in detail how the combustion engine is coupled in a shiftable manner with the planetary gear, and how this coupling or respectively uncoupling takes place. The engine shaft 23, driven by the combustion engine, and the sun wheel 6 of the (two-speed) planetary gear are able to be coupled. The coupling preferably takes place with a synchronous or approximately synchronous rotation rate of the engine shaft 23 and sun wheel 6, which makes additional measures for a mechanical synchronization unnecessary. The engine shaft 23 lies coaxially here to and within the sun wheel 6.

A coupling member 26 is arranged in a torque-proof and axially displaceable manner on the engine shaft 23. An axial displacement of the coupling member 26 for coupling takes place by suitable actuating elements, which takes place in the embodiment illustrated in FIG. 13 for example hydraulically via piston 29. An axial bearing 27 is provided for equalizing the rotation rate. A spring 28 pretensions the system against the elastic force. The coupling member 26 preferably acts in a positive-fitting manner and can be brought into engagement with the sun wheel 6 by the application of pressure. Alternatively, of course provision may also be made that the coupling member is torque-proof relative to the sun wheel 6 and is axially displaceable for engagement with the engine shaft 23.

In the method for operating the described hybrid drive unit, the following considerations are additionally relevant:

In order to minimize the clutch size and the clutch wear, the system is preferably configured so that the clutches are not used as starting element. This is achieved by a clutch which may be present between electric motor and gear being closed at standstill and the first speed of the gear being selected with the transmission which is more favourable for starting up. The torque required for starting up is then provided by the electric machine. The combustion engine is only coupled in when the input shaft rotation rate of the gear is greater than the idling rotation rate of the combustion engine. If the clutch between combustion engine and gear is embodied here as a positive-fitting clutch, initially the combustion engine rotation rate is adapted to the input shaft rotation rate before the clutch is actuated. This can take place either via a control arrangement of the fuel- and/or combustion air supply, or else by a torque modulated by a generator/modulator coupled with the combustion engine.

In order to save further costs, the generator/motor, which is to be provided when the system is also to be operated in a serial hybrid manner, or when no clutch is to be used as starting element, can also be used for the drive of ancillary assemblies, for example an air conditioner compressor which is present. In addition, the electric driving machine can be used to start or stop the combustion engine. Preferably for this the generator/motor is arranged in the belt drive which connects the combustion engine with the air conditioner compressor. Advantageously, clutches are provided here which are integrated in the belt pulley and which can either uncouple the air conditioner compressor or the combustion engine from the belt drive. It is also advantageous if clutches are used which are of equal size or are even identical.

In order to configure the generator/motor as economically and efficiently as possible, it should be constructed here as a high rotation rate machine with maximum rotation rates greater than 10,000 l/min, more preferably 15,000 l/min. In order to provide the necessary starting torque on the combustion engine or respectively in order to carry out the necessary rotation rate adaptation, the belt pulley diameters of generator/motor and combustion engine are to be in the proportion of the maximum rotation rates. Preferably, therefore, the ratio is between 1:2 and 1:4. The air conditioner compressor can be configured here freely in the rotation rate; the diameter of the belt pulley is to be adapted accordingly.

Some structural distinctive features of the hybrid drive unit which are to be emphasized are described separately below, which constitute respectively discrete families of inventions, and in particular can also be used detached from the hybrid drive unit described above. These structural embodiments constitute particular solutions for technical problems typically occurring in the drive unit described above. In particular, these aspects relate to solutions for component oiling, especially for component oiling of a planet carrier, for embodiment of a housing part of the drive unit with partition walls for the division of oil chambers and for the reduction of splash losses, and a particular arrangement and embodiment of a pump shaft, which makes possible a freewheeling in one direction of rotation, in order to prevent a suction operation in the case of a reversal of the direction of rotation in the drive.

A further aspect which is to be particularly emphasized and is likewise regarded as a discrete invention, which can also be used detached from the hybrid drive unit which is described, relates to the hydraulic system of the drive unit and the method for its control. A hydraulic circuit diagram, in which the elements named below are used and illustrated, is shown in FIG. 14.

If the friction clutches are embodied as hydraulically actuated, wet-running multi-disc clutches, then a pressure- and lubricating oil supply and also a cooling oil supply is required for this. The pressure- and the lubricating oil supply must be provided here both while stationary and also in operation, whereas the cooling oil supply only has to be provided during the power shift.

Since usual electrically operated oil pumps can indeed provide a high pressure, but not necessarily at the same time a high volume flow, it is appropriate to use such a pump for the pressure oil supply.

In contrast to this, pumps which are coupled mechanically to the drive train are suited to providing a high volume flow, but should only be operated with a low pressure to increase the efficiency. Therefore, with a corresponding configuration they are well suited to cover the cooling oil requirement of the gear. As the drive upshift in a two-speed transmission only takes place at very high rotation rates, the pump size can preferably be selected to be so small here that a sufficient cooling oil flow is only available at vehicle speeds close to the shift points. Preferably, therefore, the size of the cooling oil pump is configured to be smaller than 5 cm$^3$, more preferably to be smaller than 3 cm$^3$.

As the lubricating oil supply of the gear likewise only requires a low pressure, the cooling oil pump is also readily suitable for the lubricating oil supply of the gear. However, at a standstill and at very low vehicle speeds, sufficient lubricating oil would not be available for operating the gear.

In order to circumvent this problem a device can be provided, by which the pressure oil pump can be coupled to the lubricating oil circuit. Therefore, the supply of lubricating oil to the gear can be guaranteed at low vehicle speeds. If jointly used connections are provided for the cooling oil- and lubricating oil circuit, a possibility should preferably be provided to shut off or limit the cooling oil flow, whilst the pressure oil circuit is connected with the lubricating oil circuit, so as not to require too much volume flow from the pressure oil pump.

Likewise, the pressure regulation of the cooling oil-/lubricating oil circuit, in so far as it is present, should be placed out of operation whilst the pressure oil pump is connected with the lubricating oil circuit, because otherwise the necessary pressure for actuating the clutches can not be built up. Preferably here the uncoupling of the pressure regulation and the coupling of the pressure oil supply can take place in the same element (valve).

As the oil must be filtered regularly in hydraulically actuated automatic transmissions, in order to be able to guarantee the operational reliability of the transmission, a filter should be provided. Usually, suction filters are provided here in front of the pumps, and pressure filters in the oil circuit. Preferably, in the present case the pressure filter is inserted here in the lubricating oil circuit, because here during operation a through-flow is always guaranteed. If, however, the same pump is used for the lubricating oil- and cooling oil supply, then the pressure filter would have to be configured to the volume flow of the cooling oil flow.

In order to avoid this, a bypass valve can be provided, which at least partially directs the oil around the filter whilst the clutch is cooled. Preferably, the valve is actuated here by the same element by which the cooling oil supply can be separated from the lubricating oil supply.

Thereby, a system is described for the oil supply of a clutch- and/or gear assembly, in particular for a clutch- and/or gear assembly for a drive train as described in the introduction, with a cooling oil supply and a lubricating oil supply, in which the cooling oil supply circuit and the lubricating oil supply circuit can be connected with each other and/or separated from each other by a switching element.

A further aspect, which is also regarded as a discrete invention and which can also be used detached from the described hybrid drive unit, is described below with reference to FIGS. 15 and 16.

With the use of drive units, by means of which the motor vehicle is driven, according to the operating state, electromotively, by combustion engine or by a combination of electromotive and combustion engine drive, with regard to particular operating states, technical problems are to be solved which are already solved in vehicles which are operated purely by combustion engine or due to the concept are to be classed as unproblematic. Some of these technical problems are explained below and the respective solutions according to the invention are indicated, which are all regarded as an invention both alone and also in combination with each other and in particular also for use in the hybrid drive unit defined above.

Hybrid-driven vehicles as a rule have, on the basis of the concept, either only one rigid gearing or—compared with conventional vehicle transmissions—only a few gear stages. As a rule, a reverse gear is not provided at all here. The reverse travel is achieved via a reversal of direction output shaft of the electric drive. However, this has the result that the elements coupled in any way with the output shaft are driven in reverse rotation direction compared with the rotation direction on forward travel. In so far as this is in fact desired for example in the case of the wheels, in order to make reverse travel possible, this can lead to problems with particular functional assemblies. In particular, feed pumps are to be mentioned here, in which the risk exists on reversal of rotation direction of pumping or respectively drawing where possible contrary to their intended conveying direction.

It is therefore a task to provide a pump drive which does not allow the problem described above to occur. On the taking of the pump drive power or respectively of the pump drive torque from a rotating shaft linked to the travel direction, for example from a shaft of the gear, for example for driving a lubricating oil pump, it is to be ensured that the transmission of the drive power or respectively of the drive torque on reversal of rotation direction of the shaft is interrupted.

This can be realized in that the pump drive power is introduced into an input member which is to be driven, and the input member is connected with an output member, at which the pump drive power is taken, via a freewheel arrangement, which couples the input member and the output member with each other in a torque-proof manner in a first rotation direction, and allows them to rotate relative to each other in a second rotation direction contrary to the first rotation direction, in order to transfer no drive power in the second rotation direction.

The concrete proposal is of a hollow shaft 40, fitted with ball bearings on both sides, with an outer drive wheel 41 (for example outer gear wheel or belt pulley), which is connected with a transmission shaft (not shown) rotating dependent on the travel speed and/or travel direction.

Within the hollow shaft 41 (input member) a second shaft 44 (output member) lies, preferably slidingly mounted via sliding bearings 43, with means for connection with a lubricating oil pump 45, in particular with a toothing 46. Both shafts 40, 44 are connected by means of a freewheel arrangement 42.

The pump drive represented above functions here as follows: With the drive forwards, the hollow shaft 40 is driven and transfers the force via the non-positive freewheel arrangement 42 on forward travel, to the shaft 44 lying in the interior, which is connected via the output 46 directly with the lubricating oil pump 45. Both shafts 40, 44 therefore rotate in the block free of rotational speed difference. The sliding bearing 43 is therefore stressed exclusively statically.

With the reverse drive, i.e. on reverse travel, the hollow shaft 40 is driven contrary to the usual direction of rotation. A power transmission to the pump shaft 44 lying on the interior can not take place, owing to the freewheel arrangement 42; therefore, the shaft 44 together with lubricating oil pump 45 is stationary. The rotational speed difference between the two shafts 40, 44 corresponds to the hollow shaft rotational speed 40. The sliding bearing 43 must receive this rotation speed, but the moment occurring here only corresponds to the frictional force occurring between the two shafts. Thereby, the stress of the sliding bearing 43 is non-critical. According to the invention, it is therefore ensured that the pump 45 does not draw the oil chamber empty.

A pump drive arrangement is therefore described, in which the pump drive power is introduced into an input member and the input member is connected with an output member, at which the pump drive power is taken, via a freewheel arrangement, which couples the input member and the output member with each other in a torque-free manner in a first rotation direction, and allows them to rotate relative to each other in a second rotation direction contrary to the first rotation direction, in order to not transfer any drive power in the second rotation direction.

A further problem which occurs in a drive unit according to the type described in this application and which is already addressed above, is that of ensuring the oil supply (lubricating- and cooling oil). Particularly attention is to paid here that the positively occurring transmission losses are kept as low as possible.

In the housings of the drive unit described above, several partition walls are situated for this purpose. These divide the oil sump 50 with the lubricating oil situated therein, which is preferably constructed by the housing itself, into different regions and provide for a defined oil flow in the gear. This is shown by FIG. 17.

A first partition wall 51 delimits the oil volume for actuating elements 54 and lubricating oil pump 52 and makes provision that also under longitudinal and transverse acceleration the intake fitting 53 of the actuator always stands in the oil. A second partition wall 55 shields the final drive from the oil sump 50. The oil sump 50 for the lubricating oil pump 52 is formed by this second partition wall 55. The suction nozzle 56 of the lubricating oil pump 52 therefore also always stands in the oil, like the intake fitting 53 of the actuator.

At the same time, by the shielding, the splash losses in the gear are reduced. As soon as the final drive rotates in the intended rotation direction 57, the oil, which stands in the space around the gearwheel, is conveyed out by the gearwheel and fills the two other regions. The oil flow is represented in FIG. 17 by the red direction arrow (reference number 59). The region around the final drive is therefore almost oil-free in operation, which has a positive effect on the splash losses. So that the gearwheel does not run completely dry, oil can be replenished through an inflow duct 58. The cross-section of this duct 58 is selected to be so great that only the minimally required amount of oil is replenished at the tooth contact.

A housing for a clutch- and/or gear assembly, in particular for a clutch- and gear assembly for a drive train as described in the introduction, is therefore disclosed, in which partition walls are provided within the housing, which separate, as oil barriers, different regions of the oil sump from each other. Such a housing can be combined particularly expediently with the hydraulic system already previously described for the supply of the drive unit with lubricating- and cooling oil, but can also of course be used detached from the described hybrid drive unit.

A further embodiment, to be regarded as a discrete invention, likewise concerns the aspect of the component oiling, which can likewise also be used detached from the described hybrid drive unit and which serves primarily to ensure the sufficient oiling of the bearings of the planetary gear, which are embodied as a rule as needle bearings. The concern in particular is with the oiling of the needle bearings of the planet wheel. A further aspect which is regarded as a discrete invention is the axial securing of the planet pins. Both are explained in detail below with reference to FIGS. 18, 19 and 20.

An oiling plate 60 in the form of a simple sheet metal part is connected with the planet carrier 61 via a bayonet closure 62 constructed on the planet carrier 61. This sheet metal part, preferably constructed in a ring shape, ensures both the oiling of the needle bearings 63 on the planet wheel 64 and at the same time additionally secures the planet pin 65 in axial direction.

The oiling plate 60 has one or more lugs 66, which are bent over and thereby secure the oiling plate 60 against rotation. The lugs 66 are formed on the edge by axially outwardly directed peripheral regions, which engage behind a bayonet-like undercut 67 on the planet carrier 61. In order to ensure the oiling of the bearings 63, an edge 68 of the oiling plate 60 is slightly offset and forms a type of encircling oil collecting funnel. This edge 68 serves to collect the oil and direct it in a targeted manner in oil conveying bores 69, which are provided inside the planet pins 65. The oil flow direction is shown in FIG. 19 by white arrows.

The oiling plate 60 can also be constructed as a plastic part, in which the lugs are already somewhat raised, so that a subsequent bending around is no longer necessary. On the turning in, which can be seen from the figures, behind the undercuts 67 provided on the planet wheel carrier 61, the lugs 66 firstly bend slightly in and spring back again as soon as the oiling plate 60 is in the intended installation position, so that they form a lock against rotation acting in a positive-fitting manner.

A sheet metal part is thereby described, which is constructed such that it is able to axially secure the planet pins in an intended installation position on a planet wheel carrier of the planetary gear. In addition, a sheet metal part is described which is constructed such that it is arranged in an intended installation position on a planet wheel carrier adjacent to the planet pins, wherein oil conveying bores are provided in the planet pins, and the sheet metal part has an offset promoting the conveying of oil into the oil conveying bore. These sheet metal parts are preferably the same component which undertakes both functions simultaneously.

LIST OF REFERENCE NUMBERS

1 combustion engine (CE)
2 generator
3 electric drive motor/E machine (EM)
4 planetary gear
5 shaft
6 sun
7 carrier
8 hollow wheel
9 final drive transmission stage
10 battery/accumulator
11 lines
12 housing
13 differential
14 side shafts
K1 first clutch
K2 second clutch
B brake
20 transmission CE/EM/gearwheel stages
21 rotation direction reversing element
22 claw clutch
23 engine shaft
24 drive input E machine
25 axle drive pinion/output member
26 coupling member
27 axial bearing
28 pretensioning spring
29 hydraulic piston
49 hollow shaft
41 drive wheel
42 freewheel arrangement
43 sliding bearing
44 second shaft
45 lubricating oil pump
46 output for the lubricating oil pump
50 oil sump
51 first partition wall
52 lubricating oil pump
53 intake fitting
54 oil volume for actuating elements
55 second partition wall
56 suction nozzle 57 rotation direction of the final drive
58 inflow duct
59 oil flow
60 oiling plate
61 planet carrier
62 bayonet closure
63 needle bearing
64 planet wheel
65 planet pin
66 lug
67 bayonet-like undercut
68 edge of the oiling plate
69 oil conveying bores

The invention claimed is:

1. A hybrid drive unit for a hybrid vehicle comprising:
an electric drive machine for delivering an electromotive drive power;
a combustion engine drive machine for delivering a combustion engine drive power; and
a transmission comprising a combined clutch-and-gear assembly;
wherein the transmission comprises (a) a planetary gear train comprising a sun wheel, a planet carrier, and a hollow wheel; (b) at least a first gear ratio and a second gear ratio; and (c) a first clutch comprising a first clutch device arranged in the sun wheel,
wherein in both first gear ratio and second gear ratio, the electromotive drive power and combustion engine drive power are both introduced at the sun wheel, and wherein the combusion engine drive power is introduced into the sun wheel through positive engangement of the first clutch device.

2. The hybrid drive unit according to claim 1,
wherein the transmission further comprises an output member and a second clutch,
wherein a drive power leaves the planetary gear train through the output member, and
wherein the second clutch is capable of coupling the sun wheel and the output member such that they do not move relative to one another when acted upon by torque.

3. The hybrid drive unit according to claim 1,
wherein the transmission is arranged in a housing, and
wherein the hollow wheel can be coupled to the housing such that it does not move relative to the housing when acted upon by torque.

4. The hybrid drive unit according to claim 1,
wherein the planetary gear train comprises gear stages, and
wherein the gear stages are configured such that the constant power range of the electric drive machine in the first gear ratio joins on approximately seamlessly to the constant power range in the second gear ratio.

5. The hybrid drive unit according to claim 1,
wherein the following are arranged coaxially:
(a) the combustion engine drive machine,
(b) a drive input by which the electromotive drive power is introduced into the sun wheel,
(c) the planetary gear train, and
(d) an output member, through which a drive power leaves the planetary gear train.

6. A method for operating a hybrid drive unit according to claim 1,
wherein the transmission is arranged in a housing,
wherein the transmission further comprises a second clutch and a brake, and
wherein the planetary gear train is multi-speed, the sun wheel is a first member of the planetary gear train, and the carrier and the hollow wheel are second members of the planetary gear train,
wherein the method comprises the following steps:
(a) introduction of the electromotive drive power and the combustion engine drive power into the sun wheel of the planetary gear train,
(b) providing a first gear ratio by holding a second member of the planetary gear train with the brake such that it does not rotate relative to the housing when acted upon by torque,
(c) providing a second gear ratio by closing the second clutch, wherein the second clutch locks two of the sun wheel, the planet carrier, and the hollow wheel together,
wherein when the second clutch is closed the brake is not actuated, and when the brake is actuated the second clutch is open, and
wherein the combusion engine drive power is introduced into the sun wheel through positive engagement of the first clutch device.

7. The method according to claim 6,
wherein the rate of rotation of the combustion engine is adapted to the rate of rotation of an input shaft of the transmission prior to actuating the first clutch.

8. The method according to claim 6,
wherein a recuperation operation occurs when a vehicle containing the hybrid drive is at low vehicle speed in one gear ratio or at high vehicle speed in another gear ratio.

9. The method according to claim 6,
wherein the accelaration of a vehicle containing the hybrid drive from standstill occurs electromotively, and wherein, during operation of the vehicle, the combustion engine drive machine may only be coupled to the sun wheel when an input shaft rotation rate is equal to or greater than an idling rotation rate of the combustion engine.

10. A power transmission system in a hybrid vehicle, comprising:
an internal combustion engine having an engine output shaft;
an electric motor having a motor output shaft;
a clutch device; and
a transmission comprising a planetary gear train, wherein the planetary gear train comprises a sun gear, a planet carrier, and a hollow wheel, and wherein the planetary gear train comprises a plurality of gear ratios;
wherein the engine output shaft and the motor output shaft deliver power to the sun gear in all gear ratios, and wherein the motor output shaft engages the sun gear through positive engagement of the clutch device.

* * * * *